United States Patent [19]

Chen

[11] 4,411,824

[45] Oct. 25, 1983

[54] METHOD OF MAKING A CATALYST SUITABLE FOR HYDROMETALATION OF HYDROCARBONACEOUS FEEDSTOCKS

[75] Inventor: H. Chiu Chen, Novato, Calif.

[73] Assignee: Chevron Research Company, San Francisco, Calif.

[21] Appl. No.: 407,207

[22] Filed: Aug. 11, 1982

Related U.S. Application Data

[63] Continuation of Ser. No. 262,858, May 12, 1981, abandoned.

[51] Int. Cl.$^3$ .......................... B01J 21/04; B01J 23/24
[52] U.S. Cl. ................................. 502/323; 208/251 H
[58] Field of Search .................... 252/465; 208/251 H

[56] References Cited

U.S. PATENT DOCUMENTS

| | | | |
|---|---|---|---|
| 3,898,155 | 8/1975 | Wilson | 208/251 H |
| 4,113,661 | 9/1978 | Tamm | 252/465 |
| 4,119,531 | 10/1978 | Hopkins et al. | 252/465 X |

*Primary Examiner*—W. J. Shine
*Attorney, Agent, or Firm*—D. A. Newell; S. R. LaPaglia; C. L. Hartman

[57] ABSTRACT

A method of manufacture of a catalyst for hydrodemetalation of feedstocks having a calculated pore diameter of at least 125 Angstroms; a surface area of at least 100 m$^2$/g; a pore volume of at least 0.5 cc/grams; with at least 5% of the pore volume present provided by pores having a diameter of at least 1000 Angstroms and containing no more than 6% of catalytic metals from Group VIB and no more than 3% of catalytic metals from Group VIII.

12 Claims, No Drawings

METHOD OF MAKING A CATALYST SUITABLE FOR HYDROMETALATION OF HYDROCARBONACEOUS FEEDSTOCKS

This is a continuation of application Ser. No. 262,858, filed May 12, 1981, now abandoned.

BACKGROUND OF THE INVENTION

The present invention relates to a process for catalytically hydrotreating heavy hydrocarbon fractions and in particular to alumina catalysts used in such a process.

Porous alumina has often been employed as a support material for various hydroprocessing catalysts for hydrocarbonaceous materials. When the feedstock is more or less free of soluble metal impurities, such as iron, nickel, vanadium and the like, ordinary porous aluminum is generally satisfactory as catalyst support. If, however, the feedstock contains high concentrations of soluble metal impurities, a conventional aluminum processing catalyst tends to rapidly build up metals near the pore mouth, thereby plugging the pores of the catalyst and reducing its activity. Since regeneration of a catalyst by removal of metals is generally impractical, the life time of a conventional alumina catalyst is limited to the time it takes to plug the pores.

Because of the shrinking world supply of oils, oil processors are faced with the necessity of utilizing feedstocks that are highly contaminated with metals. In the processing of these feedstocks, it is very desirable to remove as much of the contaminating metals as early in the refining of these feedstocks as possible, so that other downstream hydroprocessing catalysts do not suffer build-up of metals and consequent reduced activity. Removing metals also makes a higher quality final product that is less corrosive and less polluting when combusted.

A variety of demetalation catalysts have been proposed, including many that are supported by a porous refractory inorganic oxide, such as alumina. U.S. Pat. No. 3,898,155 describes a catalyst which has a wide range of pore sizes including a specified percentage of pore sizes greater than 600 Angstroms and an average pore size greater than 100 Angstroms that has high catalytic metals content. U.S. Pat. No. 4,257,922 describes a hydroprocessing catalyst for hydrocarbonaceous material derived from coal that has a bimodal pore distribution and high metals content. U.S. Pat. No. 4,119,531 describes a catalyst having pores of an average diameter of at least 125 Angstroms but no mention is made of the desirability of a substantial portion of the pore volume coming from pores of large diameter.

SUMMARY OF THE INVENTION

The present invention provides a porous alumina catalyst suitable for hydrodemetalation of hydrocarbonaceous feedstocks having a calculated micropore diameter of at least 125 Angstroms, a surface area of at least 100 m²/g, a pore volume of at least 0.5 cc/g with at least 5% of the pore volume present in pores of greater than 1000 Angstroms and containing no more than 6 weight percent of catalytic metals of Group VIB and no more than 3 weight percent of catalytic metals of Group VIII. The catalyst of the present invention is made by adding enough peptizing agent to an alumina slurry between 20° to 100° C. and mixing. The peptized mass is neutralized with a solution of a nitrogen-containing base and a dissolved salt of a Group VIB transition metal compound added. The mass is shaped, then dried at 100° C. to 260° C. for 1–5 hours, and then calcined at 450° to 825° C. in a steam atmosphere for 1–3 hours followed by 450° to 825° C. in a dry air atmosphere for 1–3 hours. Preferably the peptizing agent is formic acid or acetic acid and the nitrogen-containing base is ammonia. A soluble Group VIII metal salt can be added to the peptizing solution or the neutralization solution. Enough of a soluble Group VIB metal salt can be added to the peptizing agent or the neutralizing agent that there is 0.06 g-moles of metal per g-mole of dry $Al_2O_3$ in the finished catalyst. This invention is directed to hydrodemetalation of feedstocks that are high in soluble metal contaminants and asphaltenes by contacting the feedstocks under hydroprocessing conditions with the catalyst.

DETAILED DESCRIPTION

The present invention is a novel catalyst for hydrodemetalation of hydrocarbonaceous feedstocks containing substantial amount of metals. It has been discovered that a new catalyst made from porous alumina and characterized by having at least 5% of the pore volume present in pores of diameters of greater than 1000 Angstroms, an average pore diameter of at least 125 Angstroms and less than 6% metal content is very good at removing metals contained in hydrocarbonaceous feedstocks that are heavily contaminated with metal containing compounds, organic compounds.

Feedstocks that can be treated satisfactorily by this process may contain substantial amounts of components that boil above 540° C. They can contain metals in amounts of greater than 1000 ppm and asphaltenes in amounts at least as high as 25 weight percent. Examples of such feedstocks include crude oils, topped crude oils, both atmospheric and vacuum residua, oil obtained from tar sands and oil shales and residua from such oil and hydrocarbonaceous materials derived from coal. Such feedstocks tend to contain large amounts of metallic contaminants which include, but are not limited to, iron, nickel and vanadium. The metals are frequently found in the "asphaltene" fraction of the feedstock. As defined herein, "asphaltene" refers to that fraction of any hydrocarbon feed not soluble in n-heptane, whether or not that fraction is soluble in benzene. By removing the metals from the asphaltenes and other oil fractions that may be contaminated with metals, oil can be upgraded so that it may be further refined by conventional oil refining techniques.

The catalyst composition as prepared and employed in the demetalation process of this invention will have at least 5 percent of its pore volume provided by pores greater than 1000 Angstroms. The catalyst composition will have a nitrogen pore volume of at least 0.5 cc/gram, a surface area as determined by nitrogen adsorption of at least 100 m²/grams and an average pore diameter greater than 125 Angstroms. As employed in this specification, the average pore diameter is calculated from the pore volume in pores smaller than 1000 Angstroms by the following equation:

Average pore diameter =

$$\frac{4 \times PV \text{ (in pores less than 1000 Angstroms)} \times 10^4}{\text{Surface Area}}$$

where the average pore diameter is expressed in Angstrom, PV is expressed by cc/gram and surface area is expressed by m²/g.

The catalyst composition of this invention will contain a catalytic hydrogenating component selected from Group VIB of the Periodic Table (*Handbood of Chemistry and Physics,* 51st Edition). The concentrations of Group VIB metals should not exceed 6% by weight of metal of the finished catalyst. A hydrogenating metal component from Group VIII can be added, and should not exceed 3% by weight of the finished catalyst. The hydrogenating metal component of Group VIB is added as a soluble salt of the metal dissolved in an aqueous nitrogen-containing base solution, for example, molybdenum oxide dissolved in ammonium hydroxide solution. If no Group VIII metal is to be added to the support, but only a Group VIB metal, a soluble Group VIB metal salt may be added to the peptizing agent. An example of such a salt is phosphomolybdic acid. If a catalytic metal from Group VIII is to be added, it is added as a soluble salt dissolved in the peptizing agent, for example, cobalt acetate dissolved in formic acid.

Since most metals in heavy hydrocarbonaceous feedstocks are contained in large asphaltenic molecules, demetalation is a diffusion limited process. A catalyst with low metals is believed to be more efficient at removing metals from the feedstock because it has a lowered absolute activity, thereby, causing less metals deposition near the pore mouth and allowing the metal containing molecules in the feedstock to have access to the interior of the catalyst particle. The lower activity assures that metals will not be prematurely deposited near the pore mouth of the catalyst, plugging pores and restricting access to the center of the particle. The entire interior surface of the catalyst particle can then be used for deposition of metals from the feedstock. The result is longer life for the catalyst. It has also been noticed that the calculated average pore diameter of catalyst compositions with higher metal contents tends to be smaller than those of catalysts with lower metals content. Since access to the interior of the catalyst particle is dependent on the pore size, the catalysts with lower metals, but larger pores, allow feedstocks better access to the interior of the particles.

The catalyst of this invention is preferably prepared by peptizing needle-like alumina. For an example of an alumina useful in this invention is Kaiser Substrate Alumina SD-medium with a peptizing agent, for example, formic acid. "Needle-like" alumina is defined herein as alumina that has a microcrystalline structure resembling needles piled in random jackstraw orientation to one another, typically about 50 to 100 Angstroms long. Other aluminas may be used to obtain the desired pore structure. An example of another suitable alumina is Catapal made by Conoco, but this alumina does not have the needle-like microstructure. Another source of alumina is precalcined alumina that is co-peptized with uncalcined alumina.

The needle-like alumina is preferred since catalyst supports made from it tend to be more crush resistant. It has been found that the catalyst of the present invention will have a crush strength of greater than 10 kg/cm.

When the peptized alumina has reached a homogeneous consistency at a pH of between 3 and 6, it is back neutralized by the addition of an aqueous solution of the nitrogen-containing base. The temperature is maintained at between 20° to 100° C. during the peptization and neutralization.

The neutralized alumina is then shaped and dried. Shaping can be done by any of several conventional techniques including extrusion, pelletizing, spheridizing, and the like. Typical drying conditions are 100° to 260° C. for 1 to 5 hours. The dried material is then calcined at between 450°–825° C. in a steam atmosphere for 1 to 3 hours and then ½ to 3 hours at the same temperature in a dry atmosphere. The higher the temperature the catalyst particles are calcined the larger the average pore diameter tends to be.

The process of the present invention employs generic hydrogen treating conditions which include reactions in the temperature range of about 200° to 540° C., a total pressure in the range of from about one atmosphere to about 300 atmospheres with hydrogen partial pressure up to about 200 atmospheres, a hydrogen to oil feed ratio of up to 9000 standard liters per liter of oil and a liquid hourly space velocity of about 0.1 to about 25 reciprocal hours. The precise conditions depend on the composition of the feedstock, the purity of the product, in terms of amounts of contaminants tolerable, desired and the condition of the catalyst. The temperature may be slowly raised to compensate for the natural decrease in activity of the catalyst as metals are deposited thereon.

The present invention is particularly well adapted for use in a two stage demetalation/desulfurization process. In such a process a feedstock contaminated with sulfur and metals is passed over a bed of the catalyst of this invention at high temperature and high pressure, and then over a desulfurization catalyst under similar conditions. If the second catalyst is to have a long lifetime it is imperative that as much metal as possible be removed in the first step, otherwise the desulfurization catalyst particles will quickly lose activity. In practice, it is preferred to have a two stage bed with one catalyst bed on top of another in the same reaction vessel. Two catalyst beds so staged are particularly effective in removing metals and sulfur from highly contaminated feedstocks since the catalyst of the present invention is particularly good at removing metals and the desulfurization catalyst following will remove sulfur from a demetalized oil.

Alternatively, the catalyst of this invention can be placed in a reactor and the following desulfurization catalyst can be placed in a separate reactor so that these catalysts can be replaced individually, when either catalyst becomes inactive.

In a particularly preferred embodiment the catalyst of the preset invention is maintained at a temperature higher than the desulfurization catalyst, typically about 28° C. higher. The demetalation catalyst is more active, thereby removing a portion of the metals from the feedstock before being subjected to desulfurization. Since the desulfurization catalyst is exposed to an oil with substantial amount of metals already removed, it has a high desulfurization activity even though it is maintained at a lower temperature.

As the metal in the feedstock is removed, the metal deposits on the catalyst. The efficiency of any catalyst for removing metals from a feedstock can be measured by a metal concentration profile, i.e., the percent concentration of metals deposited on the catalyst as a function of the fractional radius of the catalyst particle. From the metal concentration profile, an average concentration of this metal on the catalyst, A, can be determined. The concentration profile usually peaks near the edge of the catalyst particle. This maximum concentration, M, and the average concentration, A, are used to determine an effectiveness factor, E, as follows:

$$E = A/M$$

The higher the effectiveness factor, the more desirable the demetalation catalyst. The metal concentration profile can be obtained with an electron microprobe. The microprobe sends a fine beam of electrons, about 1 micron diameter, onto a catalyst particle set in Bakelite, polished and coated with carbon. The beam causes characteristic X-rays of the metals to be emitted from the prepared particle. The characteristic X-ray is identified and its intensity is measured. The concentration of the metal on the catalyst can be calculated from the X-ray intensity of this metal from the catalyst and the X-ray intensity of the same metal from a standard containing known amounts of this metal. The microprobe analysis determines the metal concentration at a small area on the catalyst. The analysis can be repeated on points along the radius of the catalyst particle to obtain the concentration profile.

The access of different metals into the interior of the catalyst particle is believed to be diffusion controlled, therefore the effectiveness factors for different metals are related to the size of molecules any particular metal is associated with. Table 1 compares some of the vanadium effectiveness factors of different catalysts and the effect of diameter on the effectiveness factor.

TABLE 1

| Catalyst | Particle Diameter | V Effectiveness Factor |
|---|---|---|
| A | 1/16 | 0.31 |
| B | 1/16 | 0.60 |
| C | 1/25 | 0.80 |
| D* | 1/16 | 0.94 |

*Trilobal fluted shape. The particle diameter is twice the individual flute diameter.

Catalyst A is the desulfurization catalyst described in U.S. Pat. No. 4,113,661, which disclosure is incorporated herein by reference. Catalysts B through D are examples of the catalyst of the present invention with different geometries. B and C are cylinders and D is a trilobal fluted shape.

The effectiveness factor is a measure of how efficiently the total volume of the catalyst is used for demetalation. Good demetalation catalysts tend to have effectiveness factors close to 1 while less efficient catalysts have lower factors. Knowledge of the effectiveness factor gives some insight to the potential life time for a catalyst. More effective catalysts tend to use total catalyst volume more efficiently, while less effective catalysts tend to deposit most of the metals near the surface of the catalyst, thereby plugging pore mouths, shorting catalyst life times.

If metals tend to be deposited some fairly constant distance from the surface of the catalyst particle, it can be seen that as the particles are made smaller the effectiveness ratio increases. This method of increasing effectiveness ratio leads to packed beds of small catalyst particles that tend to have high pressure drops, rendering them unsuitable for many applications in large scale operations.

The catalyst of the present invention has a high effectiveness factor, at least 0.60 (when measuring the effectiveness of removal of vanadium) for a cylindrically extruded particle 0.0625 inches in diameter.

The examples that follow are illustrative and are not intended to be limiting.

EXAMPLE 1

This example illustrates the preparation of a catalyst support containing low levels of molybdenum.

Eight milliliters of 88% formic acid (specific gravity 1.2) was added to 300 milliliters of distilled water. This solution was added to 500 grams of Kaiser alumina at about 50° C. and about 50 milliliters every minute while mixing. The mixing continued for 20 minutes after all the solution had been added. A second solution made from 6 milliliters of 58% ammonium hydroxide, 45 milliliters of a molybdenum solution, and 200 milliliters of distilled water was added at a rate of 50 milliliters per minute while stirring. The molybdenum solution was prepared by dissolving 17.4 grams of $MoO_3$ in 17.2 milliliters of 30% $NH_4OH$ and 26 milliliters of distilled water. The temperature during the second addition was approximately 60° to 65° C. The doughy mixture was extruded with a trilobal fluted die and dried on a screen tray in a preheated oven at 120° C. for 2 hours and then at 200° C. for 2 hours. The dried extrudate was calcined at 680° C. in a steam atmosphere. After one hour, fresh dry air replaced the steam and the extrudate was calcined for another half hour at 680° C.

EXAMPLE 2

This example illustrates the preparation of a catalyst containing low levels of both molybdenum and cobalt. 34.2 g of Cobalt acetate $(Co(C_2H_3O_2)_2 \cdot 4H_2O)$ was added to 350 ml of water. This solution was added to a solution of 15 ml of 88% formic acid (specific gravity 1.2) in 250 ml of distilled water to create solution A.

Solution B is made by 12 ml of concentrated 58% ammonium hydroxide mixed with 90 ml of a molybdenum solution and 400 ml of distilled water. The molybdenum solution was prepared by dissolving 34.8 grams of $MoO_3$ in 34.4 milliliters of 30% $NH_4OH$ and 52 milliliters of distilled water.

1000 Grams of Kaiser alumina was peptized by addition of solution A while mixing over a period of 12 minutes at 50° C. The mixing continued for another 20 minutes after all solution A was added. The pH of the alumina mixture was between 3 and 6. 50 ml of Solution B was then added per minute and mixing was continued for 20 minutes after addition was completed. The final temperature was 65° C. The mixture was then extruded through cylindrical dies and dried at 120° C. for 2 hours and then 200° C. for 2 hours. The dried extrudate is calcined at 680° C. in a steam atmosphere for 1 hour and then 680° C. in a dry air atmosphere for ½ hour.

EXAMPLE 3

Example 3 shows the use of the catalyst of Example 1 in a hydrodemetalation process.

A sample of Arabian Heavy vacuum residuum boiling above 900° F+ was contacted with the catalyst of Example 1 with a liquid hourly space velocity of 1.5 reciprocal hours with a hydrogen pressure of 1700 psi at 404° C. Table II shows the difference in the concentration of sulfur, nickel and vanadium in the feedstock and in the effluent from the catalyst of Example 1, after it had run for 500 hours.

TABLE II

|  | S wt % | Ni ppm | V ppm |
|---|---|---|---|
| Feedstock | 5.12% | 36 ppm | 140 ppm |

TABLE II-continued

|  | S wt % | Ni ppm | V ppm |
|---|---|---|---|
| Effluent | 3.6% | 25 ppm | 75 ppm |

The catalyst, after an initial period of deactivation remained remarkably constant in its activity. This catalyst, when extruded in a fluted shape, has an effectiveness factor of 0.94.

EXAMPLE 4

A catalyst is made by the general method of Example 2 except enough metal salts are comulled into the alumina so that the final calcined catalyst contains 3.1 weight percent of cobalt and 9.2 weight percent of molybdenum.

The properties of this catalyst and the catalyst of Example 2 are compared in Table III.

TABLE III

|  | High Metals | Low Metals |
|---|---|---|
| Cobalt wt % | 3.1 | .92 |
| Molybdenum wt % | 9.2 | 2.8 |
| Pore Volume, cc/g | 0.97 | 1.01 |
| % of Pore Volume from pores greater than 1000 Angstroms | 26 | 18 |
| Calculated micropore diameter, Angstroms | 115 | 180 |
| Surface Area, m²/g | 250 | 184 |

It will be noticed that the higher the metal concentration is the lower the calculated micropore diameter tends to be and therefore less desirable for demetalation.

EXAMPLE 5

A reactor is charged with catalyst one-third the total charge is the catalyst of this invention extruded in round cylinders of 1/16 inch diameter. One-third of the total charge the catalyst of U.S. Pat. No. 4,113,661. One-third of the total charge is a shaped commercial desulfurization catalyst sold by Ketjen as an assymetric quadralobe. Arabian Heavy Atmospheric Residue of 4.4 wt % sulfur, 26 ppm nickel and 89 ppm vanadium is contacted with these catalysts at commercial hydroprocessing conditions. The first catalyst, contained in what is herein defined as the first zone, was kept at 28° C. higher than the second and the third catalysts, contained in what is herein defined as the second zone. The temperature was adjusted to maintain 0.6% sulfur in the product. As the first catalyst reached 427° C., it was kept at this temperature and only the temperature of the second and the third catalysts was increased to maintain sulfur specification. The end of run was reached when the temperature of the second and the third catalysts reached 427° C. The average product quality of the effluent of the first zone and the effluent of the second zone is monitored. The results are tabulated in Table IV.

TABLE IV

| Contaminant | Feedstocks | Effluent of First Zone | Effluent of Second zone |
|---|---|---|---|
| Sulfur (wt %) | 4.4 | 2.8 | 0.6 |
| Nickel (ppm) | 26 | 16 | 9 |
| Vanadium | 89 | 37 | 22 |

TABLE IV-continued

| Contaminant (ppm) | Feedstocks | Effluent of First Zone | Effluent of Second zone |
|---|---|---|---|

It can be seen that the major portion of demetalation takes place on the demetalation catalyst of this invention. A seven month life was demonstrated with this catalyst system. The middle layer catalyst alone under the same pressure and space rate demonstrated only a four month life.

I claim:

1. A method for making a catalyst for hydroprocessing hydrocarbonaceous feedstocks comprising:
    adding peptizing agent to alumina at a temperature of between about 20° to 100° C. to create a slurry having a pH of between 3 and 6;
    neutralizing the peptized alumina with aqueous solution of a nitrogen-containing base and a soluble Group VIB transition metal compound to create a shapable plastic mass;
    shaping the plastic mass;
    drying the mass at 100°–260° C. for between about 1 to 5 hours;
    calcining the dried mass at 450°–825° C. for between about 1 to 6 hours.

2. The method of claim 1 wherein the alumina is characterized by having a needle-like microstructure.

3. The method of claim 1 wherein at least a portion of the alumina has been previously calcined.

4. The method of claim 1 wherein the peptizing agent is formic acid.

5. The method of claim 1 wherein the peptizing agent contains up to 0.06 g-moles of a Group VIB metal per g-mole of dry $Al_2O_3$.

6. The method of claim 1 wherein the dried mass is calcined at 450°–825° C. for 1 to 3 hours in a steam atmosphere and then for between about ½ to 3 hours in a dry atmosphere.

7. A method for making a catalyst for hydroprocessing hydrocarbonaceous feedstock comprising:
    adding peptizing agent to alumina at a temperature of between about 20° C. and 100° C., said peptizing agent containing a soluble salt of a Group VIB transition metal compound, thereby creating a slurry having a pH of between 3 and 6;
    neutralizing the peptized alumina with an aqueous solution of a nitrogen containing base to create a shapeable plastic mass;
    shaping said mass;
    drying the mass at 100°–260° C. for between about 1 and 5 hours;
    calcining the dried mass at 450°–825° C. for between about 1 to 3 hours.

8. The method of claim 7 wherein the alumina is characterized by having a needle-like microstructure.

9. The method of claim 7 wherein at least a portion of the alumina has been previously calcined.

10. The method of claim 7 wherein the peptizing agent is formic acid.

11. The method of claim 7 wherein the peptizing agent contains up to 0.06 g-moles of a Group VIB metal per g-mole of dry $Al_2O_3$.

12. The method of claim 7 wherein the dried mass is calcined at 450°–825° C. for 1 to 3 hours in a steam atmosphere and then for between about ½ to 3 hours in a dry atmosphere.

* * * * *